(No Model.)

J. J. PARSONS.
CUSPIDOR

No. 424,815. Patented Apr. 1, 1890.

Witnesses

Inventor
John J. Parsons,
by Fowler & Fowler,
Attorneys.

UNITED STATES PATENT OFFICE.

JOHN J. PARSONS, OF BROOKLYN, NEW YORK.

CUSPIDOR.

SPECIFICATION forming part of Letters Patent No. 424,815, dated April 1, 1890.

Application filed October 12, 1888. Serial No. 287,959. (No model.)

*To all whom it may concern:*

Be it known that I, JOHN J. PARSONS, a citizen of the United States of America, and a resident of the city of Brooklyn, county of Kings, and State of New York, have invented a new and useful Improvement in Cuspidors, of which the following is a specification.

My invention relates to a cuspidor or spittoon comprising, essentially, an interior vessel and a supporting-frame for the same. The frame is so constructed as to hold the contained folded vessel in form without fastenings, and also to permit the easy insertion therein and removal therefrom of such vessel.

I will proceed to describe my invention, in connection with the accompanying drawings, which represent a cuspidor constructed after the manner of my invention.

Figure 1:
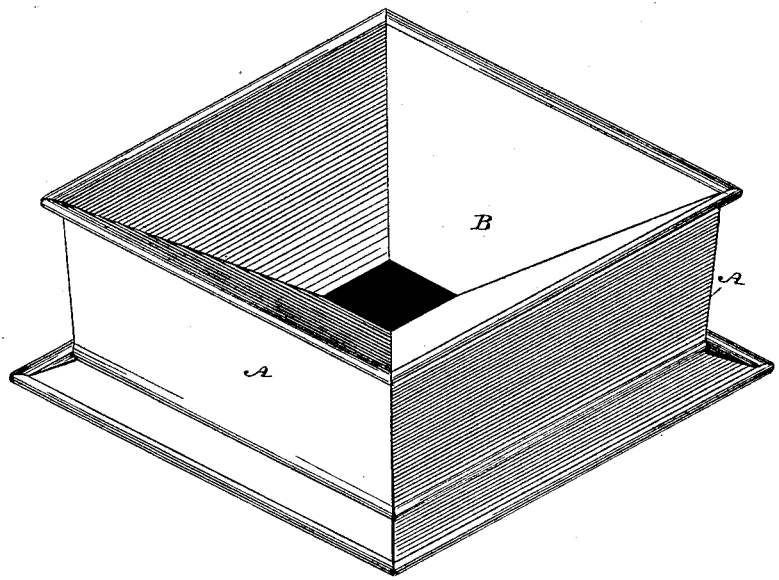
Figure 2:
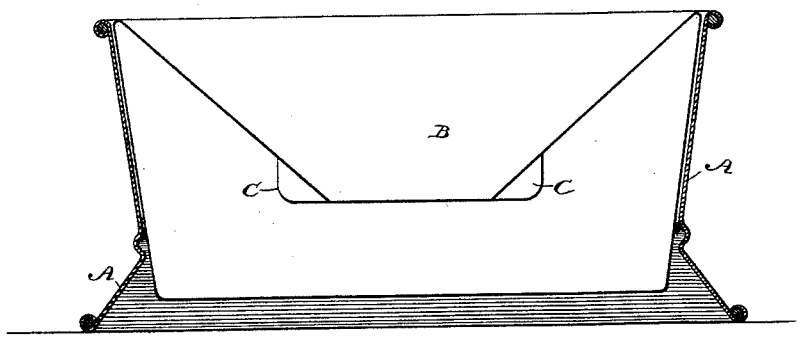

In the said drawings, in which like letters of reference designate like parts, Figure 1 is a perspective view of one of the improved cuspidors; and Fig. 2 is a sectional view of the same, taken on a transverse vertical plane.

Referring to the drawings, B represents a folded cuspidor or vessel made in general after the manner of the device shown in Patent No. 378,610, issued February 28, 1888. The folded vessel is unprovided with any fastenings for maintaining it in shape, since this is accomplished through use of a supporting-frame A, hereinafter described. As will readily be understood from the drawings herewith presented, and also from reference to the aforesaid patent, the apron or shield of the vessel, which slopes inwardly from the sides toward the center thereof, where it is provided with the usual opening leading to the interior of the vessel, is made up of sections or flaps extending from the folded-up sides of the vessel. These apron-forming flaps are provided alternately with projections C, which prevent the downward movement of the adjacent engaging-flap, as will be understood from Fig. 2. The sides of the folded vessel (here shown as four-sided) are downwardly and inwardly inclined. The interior vessel or slop-jar may be made of any suitable paper or thin flexible material, and preferably it should be sufficiently stout as to have a tendency to spring outwardly at the sides when folded into form.

The supporting and retaining frame A is rectangular in shape, conforming to the shape of the interior vessel, and has downwardly and inwardly inclined sides, having about the same obliquity as the contained vessel B. The frame is open at the top and bottom, so as to allow of the easy replacement of a vessel through the top thereof and to give access to the bottom of the slop-jar, in order that the latter may be pushed upon to eject it from the frame. The downwardly-converging sides of the frame will prevent the possibility of the vessel being forced too far in the frame, and at the same time serves as a wedging-surface for the vessel to be thrust into. The outward pressure of the sides of the vessel against the interior of the frame, due to the tendency of the vessel to unfold, causes the vessel to remain securely seated in the frame when once placed properly therein. Besides the inclination of the frame sides serving to prevent the forcing of the vessel beyond its seat on the frame, it also serves to facilitate the ejectment of the slop-jar from the frame when the bottom of the jar is pushed upon from beneath. It will thus be seen that the vessel is self-retaining when placed properly in its frame, which holds it so as to keep the apron thereof in its true position.

The frame shown has an outwardly-inclined or flaring base to prevent the cuspidor from being easily upset. Obviously the frame may take most any form so long as it fulfills the functions herein assigned to it. It may be made of wire, or papier-maché, rubber, or any other light and suitable material, such as tin or brass. The vessel or slop-jar, being made of a cheap paper or other material, is intended to be thrown away after use, while the frame can be used many times, thus becoming a permanent feature.

The operation of the device will be easily understood. A vessel or slop-jar B is folded to form and then nested or seated in the frame A, as shown in the figures. The cuspidor is then complete and ready for use. To replace the slop-jar B when the same becomes soiled or foul, the frame is held while the bottom of the jar is pushed upon, whereby it will be easily unseated and then dislodged from the frame through the top thereof. A clean new folded vessel may then be replaced in the frame, the old one being discarded.

It will be observed that the folded vessel requires no fastenings to hold the apron-flaps in position, and that no means are employed for retaining the vessel in the frame other than the inherent spring quality of the folded vessel itself, both of which features are new and are productive of novel and useful results. This greatly facilitates the manipulation of the parts of the device.

I am aware that it is not new to have a temporary vessel seated in a frame that is closed at the bottom and open at the top, so that the removal of the vessel can be effected only by handling it from above or from the top of the frame. I am further aware that prior to this there has been in use a cuspidor having a permanent frame with an open bottom, wherein is placed a temporary vessel, which is held in the frame by means of a clamp across the bottom thereof, the vessel being insertible in the frame and removable therefrom only through the bottom of the same. I therefore make no claim to either of these constructions. By my invention the temporary vessel when soiled may be easily ejected from the retaining-frame by knocking upon the exposed bottom of the vessel, thereby requiring the minimum manipulation and decreasing the liability of the operator soiling himself.

Having thus described my invention, what I claim as new, and desire to secure by Letters Patent, is—

1. In a cuspidor, a vessel or slop-jar for temporary use, combined with a frame in which the vessel may be seated and supported in operative position, such frame having an open top through which the vessel may be inserted into the frame and withdrawn therefrom, and having an open bottom exposing the bottom of the vessel, whereby the vessel may be ejected from the top of the frame by pushing upon the bottom of the vessel, for the purpose described.

2. A cuspidor comprising two separable parts—namely, a vessel folded into shape from suitable flexible material and adapted to retain matter deposited therein, and a permanent frame in which such vessel may be removably seated, the said vessel having its folded parts detached or unsecured together and held in operative position by means of the frame when the vessel is seated therein for use, the vessel acting to lock and retain itself in the frame against easy displacement therefrom by virtue of its tendency to unfold, for the purpose set forth.

3. A cuspidor comprising two separable parts—namely, a vessel folded into shape from suitable flexible material for temporary use, and a permanent frame in which the folded vessel may be removably seated, said vessel having an inwardly and downwardly inclined apron composed of flaps folded or bent over from the sides of the folded vessel and brought together to form an inclined apron, the folded parts of the vessel being unsecured together and held in operative positions by the frame when the vessel is seated therein, the said vessel acting to lock and retain itself in the frame against easy displacement therefrom by virtue of the tendency of the vessel to unfold, for the purpose set forth.

4. In a cuspidor, a vessel, such as B, of flexible material folded to form and having downwardly-converging sides, combined with a detachable frame, such as the frame A, having downwardly-converging sides and formed with an open top for the insertion and withdrawal of the vessel and with an open bottom for exposing the bottom of the contained vessel to give access thereto, substantially as and for the purpose set forth.

5. In a cuspidor, the combination, with a vessel or slop-jar, such as the vessel B, of flexible material folded to form and provided with a downwardly and inwardly inclined apron or shield composed of flaps or wings extending from the sides of the vessel, of a detachable frame, such as the frame A, for supporting the vessel and holding the parts thereof in operative position, substantially as and for the purpose set forth.

In testimony that I claim the foregoing as my invention I have signed my name, in presence of two witnesses, this 4th day of October, 1888.

JOHN J. PARSONS.

Witnesses:
W. D. DAVIS,
GEORGE F. NOYES.